(12) United States Patent
Wang et al.

(10) Patent No.: US 8,582,652 B2
(45) Date of Patent: Nov. 12, 2013

(54) METHOD AND APPARATUS FOR SELECTING A CODING MODE

(75) Inventors: Limin Wang, San Diego, CA (US); Yue Yu, San Diego, CA (US); Robert O. Eifrig, San Diego, CA (US); Jian Zhou, Fremont, CA (US); David M. Baylon, San Diego, CA (US); Krit Panusopone, San Diego, CA (US); Xue Fang, San Diego, CA (US); Ajay K. Luthra, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1544 days.

(21) Appl. No.: 11/928,440

(22) Filed: Oct. 30, 2007

(65) Prior Publication Data

US 2009/0110066 A1 Apr. 30, 2009

(51) Int. Cl.
*H04N 11/02* (2006.01)
(52) U.S. Cl.
USPC .................................................... 375/240.16
(58) Field of Classification Search
None
See application file for complete search history.

(56) References Cited

U.S. PATENT DOCUMENTS

| | | | |
|---|---|---|---|
| 6,269,192 B1 * | 7/2001 | Sodagar et al. | 382/240 |
| 6,944,224 B2 * | 9/2005 | Zhao et al. | 375/240.16 |
| 7,280,597 B2 * | 10/2007 | Zhang et al. | 375/240.16 |
| 2005/0265454 A1 | 12/2005 | Muthukrishnan et al. | |
| 2006/0198439 A1 * | 9/2006 | Zhu | 375/240.03 |
| 2006/0203907 A1 | 9/2006 | Yang et al. | |
| 2006/0245502 A1 | 11/2006 | Cheng et al. | |
| 2007/0140339 A1 * | 6/2007 | Bhaskaran et al. | 375/240.12 |
| 2007/0140352 A1 | 6/2007 | Bhaskaran et al. | |
| 2008/0247466 A1 * | 10/2008 | Wang et al. | 375/240.16 |

OTHER PUBLICATIONS

"A Study on Fast Rate-Distortion Optimized Coding Mode Decision for H.264", Tanizawa, Akiyuki et al. 2004 International Conference on Image Processing (ICIP), pp. 793-796.
"A Computation Reduction Method for RDO Mode Decision Based on an Approximation of the Distortion", Moon, Jeong Mee et al. 2006 International Conference on Image Processing (ICIP), pp. 2481-2484.
"Transform-Domain Fast Sum of the Squared Difference Computation for H.264/AVC Rate-Distortion Optimization", Lai-Man Po and Kai Guo. IEEE Transactions on Circuits and Systems for Video Technology, vol. 17, No. 6, Jun. 2007. pp. 765-773.
"Low-Complexity Macroblock Mode Selection for H.264/AVC Encoders", Huyungjoon Kim and Yucel Altunbasak. 2004 International Conference on Image Processing (ICIP), http://www.ece.gatech.edu/research/labs/MCCL/pubs/dwnlds/kim_icip04_2.pdf.
Office Action, Canadian App. No. 2,703,775 , Jun. 11, 2012.

(Continued)

*Primary Examiner* — Otis L Thompson, Jr.
*Assistant Examiner* — Amar Persaud
(74) *Attorney, Agent, or Firm* — Lori Anne D. Swanson (57) ABSTRACT

A method and apparatus for selecting a coding mode for a block of a current picture are disclosed. For example, the method selects a coding mode in accordance with a cost function, for coding the block, wherein the cost function comprises a coding distortion parameter and a number of coding bits parameter, wherein said coding distortion parameter is measured in accordance with at least one of: between a prediction residual and a reconstructed prediction residual, or between a transformed prediction residual and a dequantized transformed prediction residual, wherein the number of coding bits parameter is computed in accordance with at least one of: from a true number of compressed bits resulting from coding said block, directly from a plurality of bins, or directly from a plurality of quantized transform coefficients.

20 Claims, 3 Drawing Sheets

(56) References Cited

OTHER PUBLICATIONS

PCT Search Report & Written Opinion, Re: Application #PCT/US2008/079260, Dec. 8, 2008.
EPC Extended Search Report, Re: Application #08843903.9-1247/2206353; Jun. 19, 2012.
Xin Jun, et al, "Efficient macroblock coding-mode decision for H.264/AVC video coding", Proceedings of the Picture Coding Symposium; Dec. 15, 2004.
Hyungjoon Kim, et al, "Low-complexity macroblock mode selection for H.264/AVC encoders", Image Processing 2004; International Conference on Singapore; Oct. 24-27, 2004.
Kim C, et al, "Fast H.264 Intra-prediction mode selection using joint spatial and transform domain features", Journal of Visual Communication and Image Representation, Academic Press; Apr. 1, 2006.
JVT: "Joint Model Reference Encoding Description Text", 11. JVT Meeting; 68. MPEG Meeting; Mar. 19, 2004.
Sullivan G J, et al, "Rate-Distortion Optimization for Video Compression", IEEE Signal Processing Magazine; Nov. 1, 1998.
Chen Q, et al, "A fast bits estimation method for rate-distortion optimization in H.264/AVC", Proceedings of the Picture Coding Symposium; Dec. 15, 2004.
Ling-Jiao Pan, et al, "Fast Mode Decision Algorithms for Inter/Intra Prediction in H.264 Video Coding", Advances in Multimedia Information Processing A PCM; Dec. 11, 2007.

* cited by examiner

METHOD AND APPARATUS FOR SELECTING A CODING MODE

BACKGROUND OF THE INVENTION

1. Field of the Invention

The present invention relates to video encoders and, more particularly, to a method and apparatus for selecting a coding mode.

2. Description of the Background Art

The International Telecommunication Union (ITU) H.264 video coding standard is able to compress video much more efficiently than earlier video coding standards, such as ITU H.263, MPEG-2 (Moving Picture Experts Group), and MPEG-4. H.264 is also known as MPEG-4 Part 10 and Advanced Video Coding (AVC). H.264 exhibits a combination of new techniques and increased degrees of freedom in using existing techniques. Among the new techniques defined in H.264 are 4×4 discrete cosine transform (DCT), multi-frame prediction, context adaptive variable length coding (CAVLC), SI/SP frames, and context-adaptive binary arithmetic coding (CABAC). The increased degrees of freedom come about by allowing multiple reference frames for prediction and many more tessellations of a 16×16 pixel macroblock (MB). These new tools and methods add to the coding efficiency at the cost of increased encoding and decoding complexity in terms of logic, memory, and number of computational cycles.

The H.264 standard belongs to the hybrid motion-compensated DCT (MC-DCT) family of codecs. H.264 is able to generate an efficient representation of the source video by reducing temporal and spatial redundancies. Temporal redundancies are removed by a combination of motion estimation (ME) and motion compensation (MC). ME is the process of estimating the motion of a current frame from previously coded frame(s). This motion information is used to motion compensate the previously coded frame(s) to form a prediction. The prediction is then subtracted from the original frame to form a displaced frame difference (DFD) or more broadly, an error signal. The motion information can be determined for each block of pixel data. However, in H.264, there are seven possible block sizes within a macroblock: 16×16, 16×8, 8×16, 8×8, 8×4, 4×8, and 4×4 (also referred to as tessellations, partitions or blocks). Thus, a 16×16 pixel macroblock (MB) can be tessellated into the following sub-MB partitions: (A) one 16×16 block; (B) two 16×8 blocks; (C) two 8×16 blocks; and (D) four 8×8 blocks. Furthermore, each of the 8×8 blocks can be decomposed into: (a) one 8×8 block; (b) two 8×4 blocks; (c) two 4×8 blocks; and (d) four 4×4 blocks. Thus, there are many possible tessellations for a single macroblock.

Furthermore, for each partition block type, there are many possible prediction directions, thereby providing up to hundreds of possible partition patterns for each macroblock. One function of the encoder is to determine an optimal way of encoding a macroblock which requires selecting one of these numerous possible partition patterns for a macroblock. This selection is commonly referred to as "mode selection" or "mode decision."

Certainly, a mode selection method may simply attempt to find the best coding mode with the best performance by executing each and every possible partition pattern for a macroblock. However, this exhaustive approach is computationally very expensive and is very time consuming. Thus, the exhaustive approach may not be practical for real time applications.

SUMMARY OF THE INVENTION

The present invention discloses a method and apparatus for selecting a coding mode for a block of a current picture. For example, the method receives a block of a current picture. The method selects a coding mode in accordance with a cost function, for coding the block, wherein the cost function comprises a coding distortion parameter and a number of coding bits parameter, wherein said coding distortion parameter is measured in accordance with at least one of: between a prediction residual and a reconstructed prediction residual, or between a transformed prediction residual and a dequantized transformed prediction residual, wherein the number of coding bits parameter is computed in accordance with at least one of: from a true number of compressed bits resulting from coding said block, directly from a plurality of bins, or directly from a plurality of quantized transform coefficients.

In one embodiment, the method receives a block of a current picture. The method selects a coding mode in accordance with a cost function, for coding the block, wherein the cost function comprises a coding distortion parameter and a number of coding bits parameter, wherein the coding distortion parameter is measured in accordance with at least one of: between a plurality of original pixels and a plurality of reconstructed pixels, between a prediction residual and a reconstructed prediction residual, or between a transformed prediction residual and a dequantized transformed prediction residual, wherein the number of coding bits parameter is computed in accordance with at least one of: directly from a plurality of bins, or directly from a plurality of quantized transform coefficients.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

In one embodiment, the present invention discloses an MB-layer mode decision for a real-time motion compensated encoder, e.g., an AVC/H.264 encoder. It should be noted that although the present invention is disclosed below in the context of an AVC/H.264 encoder, the present invention is broadly applicable to a motion compensated encoder.

In brief, the present encoder employs a mode decision method that uses a non-rate-distortion (non-RD) cost function first that allows the method to quickly select a small subset of candidate partition patterns for a macroblock from all of the possible partition patterns. In turn, the mode decision method then uses a rate-distortion (RD) cost function that allows the method to finally select one of the candidate partition patterns for encoding the macroblock.

AVC supports three picture/slice types, I-picture, P-picture, and B-picture. An I-picture is coded without reference to any other picture/slice. Only spatial prediction is applied to I-pictures. In contrast, P-pictures and B-pictures can be temporally predicted. The reference frames used in temporal predictions can be any previously coded I-picture, P-picture, and B-picture. Both spatial and temporal predictions can be applied to P-picture and B-pictures.

Furthermore, AVC is a block-based coding method. As such, a picture or a slice of the picture can be divided into blocks called macroblocks. A macroblock (MB) can be coded in either intra or inter mode. AVC coding offers many possible partition types for every MB, depending upon whether the MB is from an I-picture, a P-picture, or a B-picture. It should be noted that although the present invention is described below from the perspective of a macroblock, the present invention is not so limited. Namely, the present invention can be adapted to the coding of a block of any size.

Figure 1:
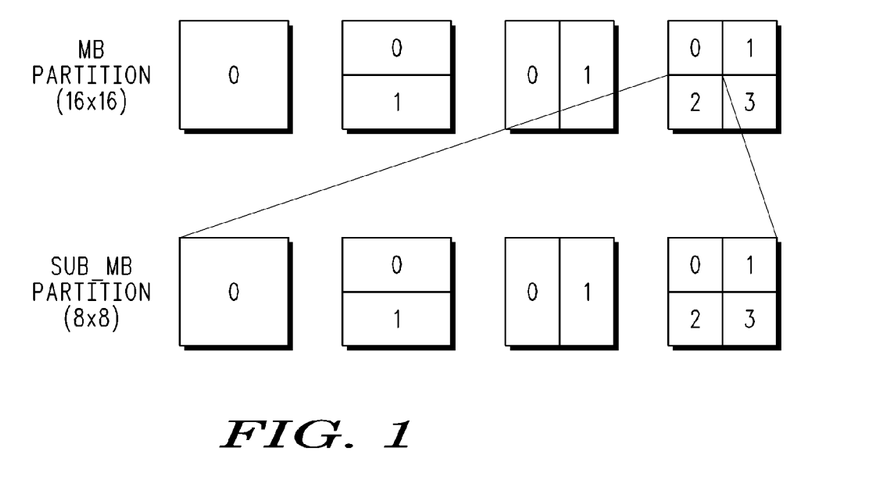
FIG. 1 illustrates various partition block types for a macroblock.

For example, in I-pictures, all the MBs are coded in intra mode. Notably, intra mode is coded using spatial prediction. In one embodiment, there are three possible MB partition types for intra mode: intra_4×4, intra_8×8, and intra_16×16 as shown in FIG. 1. Furthermore, there are nine possible spatial prediction directions for intra_4×4 and intra_8×8, as well as four spatial prediction directions for intra_16×16. In addition, for intra chroma mode, there are four possible spatial prediction directions.

However, in P-pictures and B-pictures, an MB can be coded in either intra or inter mode, where inter mode coding is performed for temporal prediction. In one embodiment, there are four possible MB partition types for inter mode. They are inter_16×16, inter_16×8, inter_8×16 and inter_8×8, as shown in FIG. 1. In inter_8×8, each 8×8 block within a MB can be further divided into sub_MB partitions of inter_8×8, inter_8×4, inter_4×8 or inter_4×4, as shown in FIG. 1. In sum, there are 3 (MB partition)+4×4×4×4 (sub_MB partition)=259 possible partition patterns per MB in inter mode.

In one embodiment, each MB/sub_MB partition of 16×16, 16×8, 8×16, 8×8, 8×4, 4×8 or 4×4 can have its own motion vectors (MV). Specifically, one (forward or backward) MV is allowed per MB/sub_MB partition in a P picture, and one (forward or backward) or two (bi-directional prediction) MVs per MB/sub_MB partition is allowed in a B picture.

In one embodiment, each MB partition of 16×16, 16×8, 8×16 or 8×8 can have its own reference picture, but the sub_MB partitions of 8×8, 8×4, 4×8 or 4×4 within an MB partition of 8×8 have to use the same reference picture.

Furthermore, in a B picture, a MB partition of 16×16 and sub_MB partition of 8×8 can further be in a direct mode, where the MVs are calculated from the co-located blocks. There are two types of direct mode, e.g., temporal direct mode and spatial direct mode.

Furthermore, AVC provides great flexibility in terms of switching between frame encoding and field encoding. For example, AVC allows switching between the frame and field coding modes on a per picture basis (know as Picture AFF). Furthermore, AVC allows switching between the frame and field coding modes on a per MB pair (known as MB AFF).

As shown from the above discussion, there are many possible coding mode choices for each macroblock. Certainly, a brute force approach can be employed, where each and every possible choice is used in an encoding process and its coding cost and coding performance are evaluated against all other possible choices. After such extensive analysis, the brute force approach will provide a coding mode that is best suited for a particular macroblock in a current frame that is being encoded. However, such brute force approach is computationally expensive and time consuming. Thus, the brute force approach is not practical in many applications where computational cycles and/or available time are greatly constrained.

Figure 2:
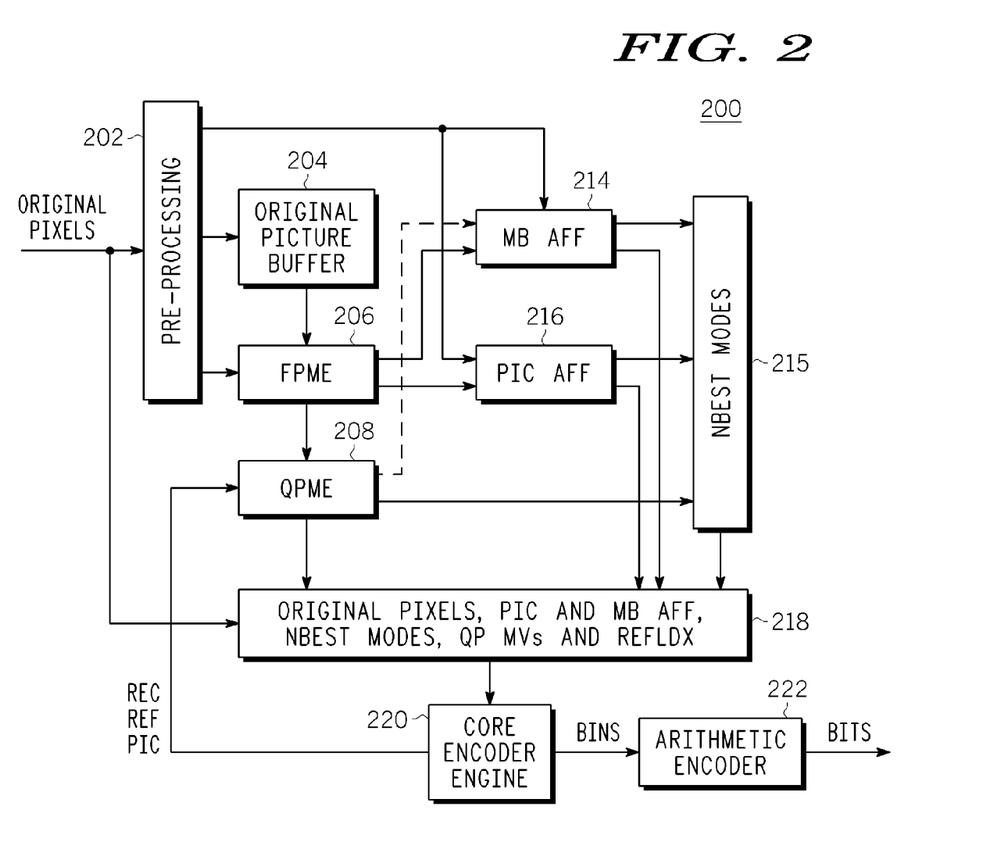
FIG. 2 illustrates a block diagram of an illustrative embodiment of an encoder in accordance with the present invention.

The present method and apparatus for performing a mode selection in a video encoder is now described. FIG. 2 depicts an exemplary embodiment of an AVC encoder 200 used in conjunction with the present invention. In one embodiment, the encoder 200 comprises a pre-processing module 202, an original picture buffer 204, a full pel motion estimator (FPME) module 206, a quarter pel motion estimator (QPME) module 208, a storage 218, a macroblock adaptive frame field (MBAFF) module 214, a picture adaptive frame field (picAFF) module 216, a NBest mode module (or broadly a mode decision module) 215, a core encoder engine 220, and an arithmetic encoder 222.

In one embodiment, the pre-processing module 202 is configured to receive incoming original pixel data from any conventional video source. For example, the pre-processing module may be responsible for calculating the frame and field vertical pixel differences, local activities, 4:2:0 conversion, noise reduction, and like tasks. It should be noted that any number of preprocessing functions can be performed in the pre-processing module 202 so that the original pixels are conditioned for further processing.

In turn, the pixel data is forwarded to the original picture buffer 204. The original picture buffer 204 may be any temporary storage area (e.g., random access memory (RAM) and the like) that serves as a holding area for the preprocessed data before it is further processed by the FPME module 206. In one embodiment, the FPME module 206 is a component that is configured to perform a full-pel motion estimation algorithm on the original pictures. The results from the full-pel motion estimation algorithm can be further refined when forwarded to the QPME module 208, where a quarter-pel motion estimation algorithm is executed. It should be noted that the quarter-pel motion estimation algorithm can be deemed as an optional step if computational cycles or time is available to perform the additional motion estimation processing.

In one embodiment, the results (e.g., motion vectors) from the FPME module 206 and/or the QPME module 208 are provided to the MBAFF module 214 which is configured to select the frame and field mode per MB pair based upon the results from the FPME 206, the QPME module 208 and/or pre-processing module 202. Similarly, the picAFF module 216 is configured to select the frame and field mode per picture based upon the results from the FPME module 206 and the pre-processing module 202.

In one embodiment, the mode decision module 215 is a module designed for selecting the N best possible modes per MB based upon the results provided from the FPME module 206, the QPME module 208, the MBAFF module 214 and/or picAFF module 216. For example, in one embodiment the mode decision module 215 is able to use a method that is capable of initially selecting a plurality of best possible coding modes. More specifically, the mode decision module 215 employs a non-rate-distortion (non-RD) cost function or method that is able to generate N best possible coding modes. The non-RD cost function only uses partially coded information for estimating the N best possible coding modes. As such, without having to perform all of the coding operations, the N best possible coding modes can be quickly deduced for applications where computational cycles are limited or where there is a severe time constraints, e.g., in real time application. The non-RD method will be described in greater details below.

In one embodiment, the original pixels, decisions from the MBAFF module and picAFF module, the N best coding modes, quantization parameters (QPs), motion vectors (MVs) and reference index (refidx) can be generated and stored in the storage 218. It should be noted that such information are generated outside of the core encoder engine 220, where they are then provided to the core encoder engine 220 to assist in the coding of the original pixels. By having processing modules outside of the core encoder engine 220, the efficiency of the core encoder engine 220 can be increased.

Once the N best coding modes (e.g., broadly referred to as candidate coding modes) are received by the core encoder engine 220, a rate-distortion cost function or method can then be employed. For example, each of the N best coding modes is employed in an encoding process such that its actual coding cost can be evaluated against the other N best coding modes. From this more computationally expensive analysis, a coding mode is selected for a macroblock. Thus, in one embodiment, the present invention applies a non-RD method first to narrow the wide range of possible coding mode choices to a list of candidate coding mode choices, and then a second RD method is applied to the list of candidate coding mode choices to select a final coding mode for a macroblock. The RD method is described in greater details below.

Once the coding mode is selected for each macroclock, the current frame is encoded to produce a plurality of bins (e.g., encoded data in binary form) as illustrated in FIG. 2. The bins are then provided to the arithmetic encoder 222 where the bins are further encoded into bits that are then provided to a transmission medium.

Figure 3:
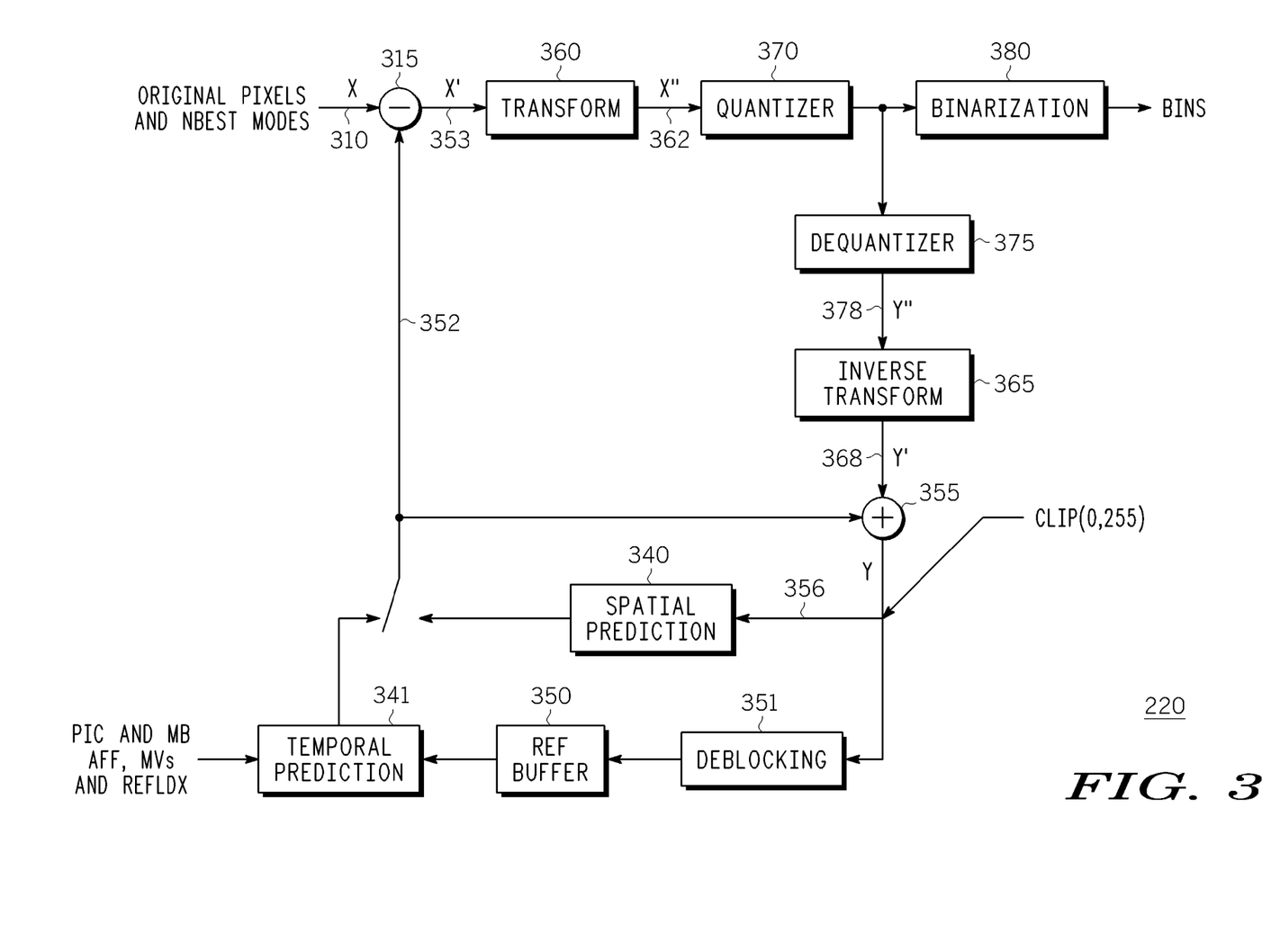
FIG. 3 illustrates a block diagram of an illustrative embodiment of a core encoder engine.

FIG. 3 illustrates an illustrative core encoder engine. In one embodiment, the core encoder engine 220 is a video encoder that is compliant with the AVC/H.264 standard. In one embodiment of the present invention, the core encoder engine 220 is part of an encoder or a portion of a more complex motion compensation coding system. The core encoder engine 220 may comprise a temporal prediction module 341, a spatial prediction module 340, a transform module 360, e.g., a discrete cosine transform (DCT) based module, a quantization (Q) module 370, a binarization module 380, an inverse quantization (Q-1) module 375, an inverse DCT (DCT-1) transform module 365, a subtractor 315, a summer 355, a deblocking module 351, and a reference buffer 350. Although the core encoder engine 220 comprises a plurality of modules, those skilled in the art will realize that the functions performed by the various modules are not required to be isolated into separate modules as shown in FIG. 3. For example, the set of modules comprising the temporal prediction module 341, spatial prediction module 340, inverse quantization module 375 and inverse DCT module 365 are collectively generally known as an "embedded decoder". Similarly, the binarization module 380 and the arithmetic encoder 222 of FIG. 2 can be implemented as a context adaptive variable length coding (CAVLC) module or context-adaptive binary arithmetic coding module (CABAC).

It should be noted that the core encoder engine 220 is described herein for the purpose of illustrating the various embodiments of the present invention. As such, the core encoder engine 220 may actually employ other modules that are not described in the present disclosure, e.g., a rate control module, one or more buffers, and the like. Furthermore, the sequence of modules and the locations of the various input and output signals are provided only as examples. Those skilled in the art will realize that the core encoder engine 220 can be adapted or implemented in a number of different variations to practice the present invention. As such, the core encoding engine is not limited by the present example as illustrated in FIG. 3.

FIG. 3 illustrates an input video image (image sequence) on path 310 which is digitized and represented as a luma and two color difference signals (Y, Cr, Cb) in accordance with the pertinent standards. These signals can be further divided into a plurality of layers (sequence, group of pictures, picture, slice and blocks) such that each picture (frame) is represented by a plurality of blocks having different sizes. The division of a picture into block units improves the ability to discern changes between two successive pictures and improves image compression through the elimination of low amplitude transformed coefficients. It should be noted that the digitized signal may have optionally undergone preprocessing such as format conversion for selecting an appropriate window, resolution and input format as discussed above in the context of preprocessing module 202. Furthermore, as illustrated in FIG. 3, along with the original pixels, a plurality of Nbest coding modes are also provided to the core encoding engine 220.

The input video image on path 310 is received into temporal prediction module 341 and/or spatial prediction module 340 for performing temporal prediction and/or spatial prediction. In one embodiment, the temporal prediction module 341 may comprise a variable block motion compensation module. The motion vectors are received by the variable block motion compensation module for improving the efficiency of the prediction of sample values. Motion compensation involves a prediction that uses motion vectors to provide offsets into the past and/or future reference frames containing previously decoded sample values that are used to form the prediction error. Namely, the temporal prediction module may use the previously decoded frame and the motion vectors to construct an estimate of the current frame.

In one embodiment, the spatial prediction module 340 may perform spatial prediction processing, e.g., directional spatial prediction (DSP). Directional spatial prediction can be implemented for intra coding, for extrapolating the edges of the previously-decoded parts of the current picture and applying it in regions of pictures that are intra coded. This improves the quality of the prediction signal, and also allows prediction from neighboring areas that were not coded using intra coding.

Furthermore, prior to performing motion compensation prediction for a given block, a coding mode must be selected. As discussed above, a plurality of candidate coding modes is provided to the core encoding engine 220. The core encoding engine 220 is tasked with selecting one of these candidate coding modes for a macroblock.

Once a coding mode is selected, the temporal prediction module 341 and/or the spatial prediction module 340 will generate a motion compensated prediction (predicted image) on path 352 of the contents of the block based on past and/or future reference pictures. This motion compensated prediction on path 352 is subtracted via subtractor 315 from the video image (e.g., labeled as signal X) on path 310 in the current block to form an error signal or predictive residual signal (e.g., labeled as signal X') on path 353. The formation of the predictive residual signal effectively removes redundant information in the input video image. Namely, instead of transmitting the actual video image via a transmission channel, only the information necessary to generate the predictions of the video image and the errors of these predictions are transmitted, thereby significantly reducing the amount of data needed to be transmitted. To further reduce the bit rate, the predictive residual signal on path 353 is passed to the transform module 360 for encoding.

In one embodiment, the transform module 360 then applies a transform, e.g., a DCT-based transform to produce a transformed signal (e.g., labeled as signal X") on path 362. Although the transform in H.264/MPEG-4 AVC is still DCT-based, there are some fundamental differences as compared to other existing video coding standards. First, transform is an integer transform, that is, all operations are carried out with integer arithmetic. Second, the inverse transform is fully specified. Hence, there is no mismatch between the encoder and the decoder. Third, transform is multiplication free, requiring only the addition and shift operations. Fourth, a scaling multiplication that is part of the complete transform is integrated into the quantizer, reducing the total number of multiplications.

Specifically, in H.264/MPEG-4 AVC the transformation is applied to 4×4 blocks or 8×8 blocks, where a separable integer transform is applied.

The resulting transformed coefficients are received by quantization module 370 where the transform coefficients are quantized. H.264/MPEG-4 AVC uses scalar quantization. One of 52 quantizers or quantization parameters (QP)s is selected for each macroblock.

The resulting quantized transformed coefficients are then decoded in inverse quantization module 375 to produce a dequantized signal (e.g., labeled as signal Y") on path 378 and inverse DCT module 365 to produce an inverse transformed signal 368 (e.g., labeled as signal Y'). Finally, a reference signal (e.g., labeled as signal Y) on path 356 is generated by the adder 355, i.e., the reference signal (e.g., the reference frame(s) or picture(s)) will be stored in reference buffer 350. Furthermore, in H.264/MPEG-4 AVC, an in-loop deblocking filter 351 is also employed to minimize blockiness before the reference signal is stored in the reference buffer 350.

The resulting quantized transformed coefficients from the quantization module 370 are also received by the binarization module 380, where the quantized signal is converted into bins. As discussed above, the binarization module 380 could be implemented as part of a context-adaptive variable length coding module (CAVLC) module or context-adaptive binary arithmetic coding module (CABAC), where the two-dimensional block of quantized coefficients is scanned using a particular scanning mode, e.g., a "zig-zag" order, to convert it into a one-dimensional string of quantized transformed coefficients. In CAVLC, VLC tables for various syntax elements are switched, depending on already-transmitted syntax elements. Since the VLC tables are designed to match the corresponding conditioned statistics, the entropy coding performance is improved in comparison to methods that just use one VLC table.

Alternatively, CABAC can be employed. CABAC achieves good compression by a) selecting probability models for each syntax element according to the element's context, b) adapting probability estimates based on local statistics and c) using arithmetic coding.

The above described core encoder engine can also be referred to as encompassing a main coding loop. In other words, the various modules in the main coding loop collectively will be able to encode input pixels into encoded bits. It should be noted that numerous variations of the main coding loop can be adapted to the present invention and the present invention is not limited to a particular implementation of the main coding loop.

One or more aspects of the present invention relate to predictive frame (i.e., INTER) mode selection in an H.264 video encoder engine or H.264-like encoder engine. Although the present invention is disclosed in the context of an H.264-like encoder, the present invention is not so limited. Namely, the present invention can be adapted to other motion compensation (MC) encoding standards.

Figure 4:
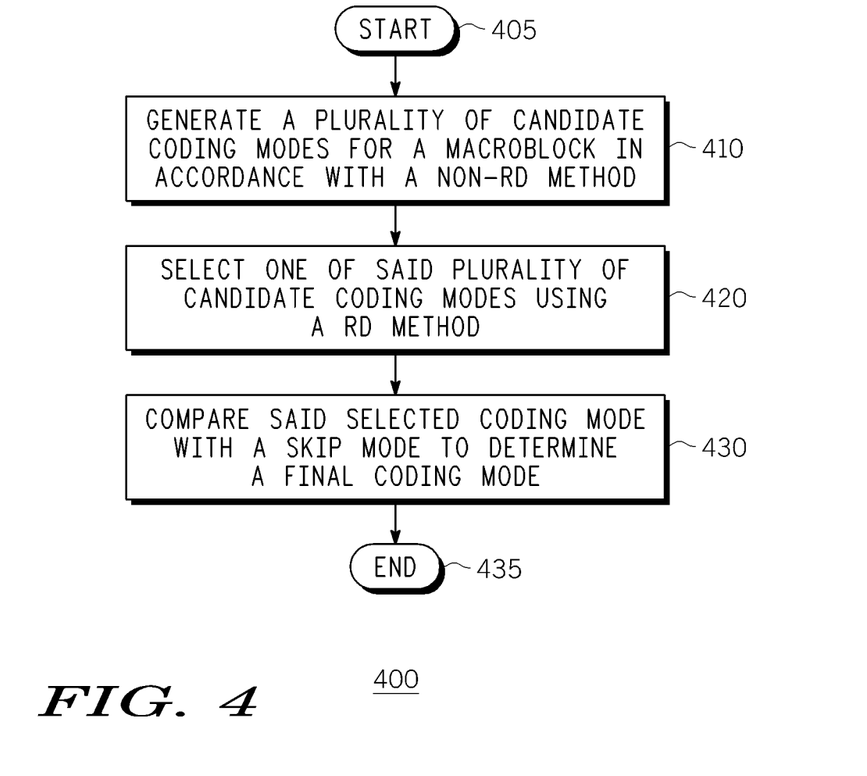
FIG. 4 illustrates a flow diagram of an exemplary embodiment of a method for selecting a coding mode in accordance with one or more aspects of the invention.

FIG. 4 illustrates a flow diagram of an exemplary embodiment of a method 400 for selecting a coding mode in accordance with one or more aspects of the invention. Method starts in step 405 and proceeds to step 410.

In step 410, method 400 generates a plurality of candidate coding modes, e.g., N best coding modes, for a coding unit, e.g., a macroblock of a currant picture to be encoded. More specifically, the plurality of candidate coding modes is generated using a non-RD method as further described below.

In step 420, method 400 selects one of the plurality of candidate coding modes as a coding mode for the macroblock. More specifically, each of plurality of candidate coding modes is evaluated using a RD method as further described below, where a candidate coding mode with the lowest cost is selected.

In step 430, method 400 optionally compares the selected coding mode in step 420 with a skip mode. For example, if the cost of the selected coding mode is lower than the cost of the skip mode, then the selected coding mode is used for encoding the macroblock. However, if the cost of the selected coding mode is higher than the cost of the skip mode, then the selected coding mode is not used for encoding the current macroblock. Instead, the skip mode is applied to the current macroblock.

Method 400 then ends in step 435. However, it should be noted that steps 410-430 are applied to each macroblock of a current picture to be encoded. As such, steps 410-430 can be repeated until all the coding modes have been determined for all the macroblocks of the entire current picture.

It should be noted that although not specifically specified, one or more steps of method 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 4 that recite a determining operation or involve a decision, do not necessarily require that both branches of the determining operation be practiced. In other words, one of the branches of the determining operation can be deemed as an optional step.

In one embodiment, the RD method uses the complete coded information to determine the mode decisions for the macroblocks. Specifically, for a full-RD solution, the encoder will encode all the candidate coding modes, e.g., provided by the N best module 215, and selects the candidate coding mode with the smallest RD cost. In one embodiment, the RD cost is defined as:

$$J = D + \lambda R \quad \text{(EQU. 1)}$$

where D is a coding distortion parameter (e.g., sum of square error in spatial domain), R is the number of coding bits parameter and λ is a constant depending upon the quantization parameter, picture type, etc. In one embodiment, the "full-RD" solution is an exhaustive method. For each possible mode, the method performs the complete encoding and decoding passes (e.g., as discussed above for FIG. 3), including the operations such as prediction, sub/add, transform/ quantization, dequantization/inverse transform, entropy coding, etc.

However, the distortion D can be measured at several different locations as illustrated in FIG. 3. For example, in a "full-RD" solution approach, the distortion D is a difference measure between signal X (e.g., on path 310) and signal Y (e.g., on path 356). In other words, the distortion D is a difference measure between the original pixels and the reconstructed pixels.

Alternatively, in one embodiment, the distortion D is a difference measure between the signal X' (e.g., on path 353) and signal Y' (e.g., on path 368). In other words, the distortion D is a difference measure between the prediction residual(s) and the reconstructed prediction residual(s).

Alternatively, in one embodiment, the distortion D is a difference measure between the signal X" (e.g., on path 362) and signal Y" (e.g., on path 378). In other words, the distortion D is a difference measure between the transformed prediction residual(s) and the dequantized transformed prediction residual(s).

It should be noted that these three different distortion measures may have slight differences, e.g., due to the clipping before and after prediction addition. Furthermore, there may be a difference in computational cycles that are required to generate the distortion measure. For example, the first approach will likely take the largest amount of computational cycles to generate the reconstructed pixels on path 356, whereas the third approach will likely take the least amount of computational cycles to generate the dequantized prediction residual on path 378. In applications where computational cycles and available time are extremely constrained, then the third approach will likely produce the necessary distortion measures in the least amount of time.

Similar to the distortion measure D, R can also be measured from a plurality of different locations. For example, in a "full-RD" solution approach, after the arithmetic coding engine 222 as shown in FIG. 2, R can be computed using the true number of compressed bits. In other words, R can be deduced by simply counting the number of bits that are generated from encoding the bins.

Alternatively, in one embodiment, R can be deduced directly after binarization, by using the bins, which serves as a good estimate of the actual number of compressed bits that will be generated when the bins are encoded. Namely, a correlation can be generated between Bin patterns and the resulting compressed bits by properly scaling the bin-to-bits ratio on a per picture type basis. For example, a look-up table can be generated that allows a method to perform a simple look-up operation to determine how many compressed bits will be generated for a given bin pattern. Entries in the look-up table can be generated by evaluating actual pictures that have been fully encoded in the past, i.e., evaluating bin patterns and their resulting compressed bit counts. It should be noted that a look-up operation requires less computational cycles than performing an arithmetic algorithm on the bins.

Alternatively, in one embodiment, R can be deduced directly after quantization, by using the quantized transform coefficients, which serves as a good estimate of the actual number of compressed bits that will be generated when the quantized transformed coefficients are binarized and the resulting bins are encoded. Namely, R can be estimated from the quantized transform coefficients through modeling the relationship of the quantized transform coefficients and the bits required for encoding the quantized transform coefficients. For example, a correlation can be generated between quantized transformed coefficients and the resulting compressed bits by properly scaling the quantized transformed coefficients-to-bits ratio on a per picture type basis. For example, a look-up table can be generated that allows a method to perform a simple look-up operation to determine how many compressed bit will be generated for a given quantized transformed coefficient. Entries in the look-up table can be generated by evaluating actual pictures that have been fully encoded in the past, i.e., evaluating quantized transformed coefficients and their resulting compressed bit counts. It should be noted that a look-up operation requires less computational cycles than performing a binarization operation followed by an arithmetic algorithm applied to the bins.

It should be noted that these three different compressed bits (R) measures may also have slight differences. Furthermore, there may be a difference in computational cycles that are required to generate the R measure. For example, the first approach will likely take the largest amount of computational cycles to generate the R after the arithmetic encoder 222, whereas the third approach will likely take the least amount of computational cycles to generate the R measure. In applications where computational cycles and available time are extremely constrained, then the third approach will likely produce the necessary R measures in the least amount of time. As such, the above various embodiments can be used in any combinations as a RD method as disclosed in step 420 of FIG. 4.

In one embodiment, the non-RD method makes mode selection or decision based upon a non-RD cost of each of coding modes. For example, the non-RD cost is in a general form as:

$$J = SAD + \lambda \times f(DMV, refIdx, picType, mbType, etc.) \quad \text{(EQU. 2)}$$

where SAD is a sum of absolute difference measure between the original pixels and their predictions (intra or motion compensated), $\lambda$ is a constant depending upon the quantization parameter, DMV is a difference of the true motion vectors and their predictions, refIdx is a reference picture index per MB partition, picType is a picture type, and mbType is a MB partition type. It should be noted that the function $f(\ )$ portion of EQU. 2 above, having a plurality of parameters listed within, should be broadly interpreted as a function based on one or more of the listed parameters. It should not be interpreted as a function that is based on all of the listed parameters.

It should be noted that in one embodiment the non-RD method uses only partially coded information for mode decision, and avoids performing all the coding operations, such as transformation, quantization, dequantization, inverse transformation, entropy coding, reconstructing, deblocking, etc. It is hence a much faster approach as compared to the full-RD solution, but at the expense of providing less accuracy in mode decision.

It should be noted that the constant $\lambda$ and the function $f(\ )$ may vary at different coding stages. They will be further described below in different embodiments.

In one embodiment, the inputs to the MB mode decision process are the motion information (e.g., the MVs and refIdx (es)) and the associated non-RD costs per MB partition in inter mode in either frame or field mode from QPME, the non-RD costs per prediction direction in intra mode in either frame or field mode, the actual current MB QP value(s), and the neighboring MB coding information (e.g., MVs, frame/field type, quantization QP values, reconstructed luma and chroma pixel values). At this point the MB frame or field type is already known so that the MB mode decision is only performed for either frame or field mode. It is assumed that for each inter MB partition, the best refIdx(es) and QPME MVs are already determined.

In one embodiment, the output of the present process is the selected MB coding mode information, including reconstructed luma and chroma pixel values. The present mode decision process will now be described first from the perspective of under the MB layer (broadly a lower block layer). In other words, since mode decisions can be made for portions of a macroblock (i.e., smaller than the size of the MB), the present invention will first attempt to narrow the number of possible coding mode choices under the MB layer.

In one embodiment, under the MB layer, a non-RD cost is used to select a plurality of candidates at the under the MB layer. For example:
1) Select one mode out of nine possible prediction direction modes for intra__4×4 for I, P and B picture/slice;
2) Select one mode out of nine possible prediction direction modes for intra__8×8 for I, P and B picture/slice;
3) Select one mode out of four possible prediction direction modes for intra__16×16 for I, P and B picture/slice;
4) Select inter__8×8 (or one mode out of inter__8×8, inter__8×4, inter__4×8, and inter__4×4 if the smaller block sizes are currently supported) per sub_MB partition of 8×8 for P picture/slice, and
5) Select one mode out of inter__8×8 and direct__8×8 (or one mode out of inter__8×8, direct__8×8, inter__8×4, inter__4×8, and inter__4×4 if the smaller block sizes are currently supported) per sub_MB partition of 8×8 for B picture/slice.

It should be noted that in each of the above five selecting steps as discussed above, a non-RD method is employed, e.g., using EQU. 2, as disclosed above. In other words, each of the selecting steps will select at least one possible coding mode based a lowest non-RD cost. For example, nine non-RD costs are generated in step 1, from which the coding mode with the lowest non-RD cost is selected. This procedure is repeated for steps 2-5 as well. It should be noted that although the above disclosure only indicates that one coding mode is selected in each step, the present invention is not so limited. Namely, the present invention may select one or more coding modes at each step.

In turn, at the MB layer (broadly a higher block layer, e.g., one layer above the under the MB layer), a non-RD cost is again used to select a plurality of candidates at the MB layer. For example:
1) Select 1≤Ni≤3 modes out of three possible modes (intra__4×4, intra__8×8 and intra__16×16) for I picture/slice;
2) Select 1≤Np≤7 modes out of seven possible modes (intra__4×4, intra__8×8, intra__16×16, inter__16×16, inter__16×8, inter__8×16, and inter__8×8) for P picture/slice; and
3) Select 1≤Nb≤8 modes out of eight possible modes (intra__4×4, intra__8×8, intra__16×16, inter__16×16, inter__16×8, inter__8×16, inter__8×8/direct__8×8, and direct__16×16) for B picture/slice.

It should be noted that in each of the above three selecting steps as discussed above in the MB layer, a non-RD method is employed, e.g., using EQU. 2, as disclosed above. In other words, each of the selecting steps will select at least N (e.g., $N_i$, $N_p$, or $N_b$) possible coding modes based their non-RD costs. For example, three non-RD costs are generated in step 1, from which one or more coding modes (e.g., up to three coding modes) with the lowest non-RD costs are selected. This procedure is repeated for steps 2-3 as well.

In turn, once the N best candidate coding modes are generated at the macroblock level, then it is necessary to select one candidate coding mode to be used for a current macroblock. In one embodiment, the present invention uses a RD cost approach, e.g., EQU. 1, as disclosed above. For example, the method selects one coding mode out of the N possible modes selected above, where N is Ni for I picture/slice, Np for P picture/slice, or Nb for B picture/slice. For example, using the RD cost function, a final coding mode with the lowest cost will be selected in accordance with the picture type.

In one embodiment, the selected final coding mode is evaluated in an optional step, where the final coding mode is compared to the cost of a skip mode. The skip mode is where a macroblock is skipped during encoding of the video sequences (i.e. no coded data is transmitted for the macroblock). It should be noted that macroblocks that can be skipped with little or no increase in distortion are not coded, thereby resulting in substantial computational savings without significantly affecting rate-distortion performance. However, it is often the case that by skipping a macroblock, there is a slight increase in the distortion due to not coding the macroblock.

More specifically, if the RD cost J of the selected final coding mode is smaller than that of the skip mode, then the selected final mode is selected as the coding mode for encoding the macroblock. Otherwise, the method selects the skip mode instead of the selected final mode. In one embodiment, for the skip mode, the RD cost is equal to the energy of the prediction residuals or the coding distortion, that is, J=D. It should be noted that for MB AFF, if the skip mode is selected for the current MB pair but the frame/field type is not consistent with the inferred type from its neighbors, then the reconstructed MB pixels should be recalculated for the correct skip mode for MBs in pictures which are used as reference pictures (or the skip should be disabled for the current MB).

In one embodiment, the above RD cost function of EQU. 1 can be expressed as:

$$J=D+\lambda \times (\alpha \times bins) \qquad (EQU. 3)$$

where bins is a number of bins generated from the candidate mode, α=total_bits/total_bins for the previously coded picture of the same type (I, P or B), D is the coding distortion, and λ is the RD lambda_mode value. For example, for the first I picture, α is set as 0.75, for the first P picture, α is set to be the same as that of the previous I picture, and for the first B picture, α is set to be the same as that of the previous P picture. In one embodiment, α is reset at each scene cut. It should be noted that various constant values such as α as disclosed in the present invention should not be interpreted as limiting the present invention. Different constant values can be selected based on the requirements or specifications of a particular implementation.

It should be noted that the above RD and non-RD costs can be measured for the luma component only in order to simplify the process. In other words, although the above RD and non-RD cost methods can be applied to both luma and chroma components of the input signal, to arrive at the final coding mode, the present method can be adapted such that the RD and non-RD cost methods are only applied to the luma component of the input signal. This modified approach will reduce the number of computational cycles.

A detail description of the non-RD intra mode cost method is now presented. It should be noted that the various embodiments as described below are only intended to illustrate various illustrative implementations of the present invention and should not be deemed as limiting the present invention.

In one embodiment, the non-RD costs for intra_4×4 and intra_16×16 are calculated slightly differently. The luma cost for Intra_4×4 is now described.

In one embodiment, the non-RD cost for the 16×16 luma block of a MB using intra_4×4 prediction is determined by adding together the costs for each of the best 16 4×4 blocks within the 16×16 luma block. A 4×4 block is predicted using each of the 9 intra_4×4 prediction direction modes, and the best 4×4 block is chosen to be that with the smallest cost among the 9 possible directions. The cost of a candidate 4×4 block mode is obtained by first computing the SAD between pixels of the original 4×4 block and the intra predicted 4×4 block. The total cost for the candidate 4×4 block is then obtained by adding to the SAD value a term which is larger if the candidate 4×4 block mode is different than the neighboring 4×4 block prediction mode.

More specifically, the best intra_4×4 mode and the associated cost for a MB can be computed as follows. Let $y_k(i,j)$ be the (i,j)th pixel in the kth 4×4 luma block within the 16×16 luma block, where $0 \le i,j \le 3$ and $0 \le k \le 15$, and let $y'_{l,k}(i,j)$ be the (i,j)th pixel in the kth 4×4 luma block predicted using intra_4×4 prediction mode l, where $0 \le l \le 8$. Then the cost $c_{l,k}$ for the kth 4×4 block using prediction mode l is computed as:

$$c_{l,k} = \alpha_{l,k} \lambda_{mode} + \sum_{i,j} |y_k(i,j) - y'_{l,k}(i,j)| \quad \text{(EQU. 4)}$$

where $$\alpha_{l,k} = \begin{cases} 1, & \text{prediction direction } l \text{ of } k \text{ same as neighbor} \\ 4, & \text{otherwise} \end{cases}$$

$$\lambda_{mode} = \begin{cases} 0.85 * 2^{QP/30}, & numBframes = 0 \\ \max(2, \min(4, QP/6)), & numBframes > 0 \text{ and frame is } B \text{ frame} \\ 0.68 * 2^{QP/30}, & numBframes > 0 \text{ and frame is not } B \text{ frame} \end{cases}$$

The best intra mode and the associated cost for the kth 4×4 block are, respectively, $$\text{mode}\_4 \times 4_k = \arg\min_l c_{l,k}, \quad \text{(EQU. 5)}$$

and $$\cos t\_4 \times 4_k = \min c_{l,k}. \quad \text{(EQU. 6)}$$

The cost for the 16×16 luma block is then given as:

$$\text{Luma\_Intra\_cost}\_4 \times 4 = \sum_{k=0}^{15} \cos t\_4 \times 4_k + \text{Intra}\_4 \times 4\_\text{bias} \quad \text{(EQU. 7)}$$

and the corresponding best 4×4 intra block modes are given by mode_4×4$_k$, $0 \le k \le 15$.

The luma cost for Intra_16×16 is now described. In one embodiment, the non-RD cost for the 16×16 luma block of a MB using intra_16×16 prediction is similar to Intra_4×4 prediction except that the unit for intra prediction is now a 16×16 block. There are only 4 possible intra_16×16 prediction directions, and the cost is based entirely on the SAD value.

In one embodiment, the best intra_16×16 mode and its associated cost for a MB can be computed as follows. Let y(i,j) be the (i,j)th pixel in the 16×16 luma block of the MB, where $0 \le i,j \le 15$, and let $y'_l(i,j)$ be the (i,j)th pixel in the 16×16 luma block predicted using intra_16×16 prediction mode l, where $0 \le l \le 3$. Then the cost $c_l$ for the 16×16 luma block using prediction mode l is computed as:

$$c_l = \sum_{i,j} |y(i,j) - y'_l(i,j)| \quad \text{(EQU. 8)}$$

The best intra mode and the associated cost for the 16×16 luma block are, respectively, $$\text{Luma\_Intra\_mode}\_16 \times 16 = \arg\min_l c_l, \quad \text{(EQU. 9)}$$

and $$\text{Luma\_Intra\_cos } t\_16 \times 16 = \min c_l. \quad \text{(EQU. 10)}$$

The chroma cost for Intra MB is now described. In one embodiment, the non-RD costs for the two 8×8 chroma blocks of a MB using intra prediction is similar to Intra_16×16 prediction, except that the unit for intra prediction is now an 8×8 block, and that the same 8×8 prediction is applied to both 8×8 chroma blocks.

In one embodiment, the chroma cost of the intra MB can be computed as follows. Let Cb(i,j) and Cr(i,j) be the (i,j)th pixel of the two 8×8 chroma blocks, where $0 \le i,j \le 7$, and let $Cb'_l(i,j)$ and $Cr'_l(i,j)$ be the (i,j)th pixel of the two 8×8 chroma blocks predicted using intra 8×8 prediction mode l, where $0 \le l \le 3$. Then the cost $c_l$ for the chroma using prediction mode l is computed as:

$$c_l \sum_{i,j} \{|Cb(i,j) - Cb'_l(i,j)| + |Cr(i,j) - Cr'_l(i,j)|\} \quad \text{(EQU. 11)}$$

The best chroma intra mode and cost for the two 8×8 chroma blocks are, respectively:

$$\text{Chroma\_Intra\_mode} = \arg\min_l c_l, \quad \text{(EQU. 12)}$$

and $$\text{Chroma\_Intra\_cos t} = \min c_l. \quad \text{(EQU. 13)}$$

The final non-RD costs for the intra_4×4 and intra_16×16 MBs are, respectively:

$$\text{Intra\_cos } t\_4 \times 4 = \text{Luma\_Intra\_cos } t\_4 \times 4 + \text{Chroma\_Intra\_cos } t, \quad \text{(EQU. 14)}$$

and $$\text{Intra\_cos } t\_16 \times 16 = \text{Luma\_Intra\_cos } t\_16 \times 16 + \text{Chroma\_Intra\_cos } t. \quad \text{(EQU. 15)}$$

It should be noted that the best MB mode of intra_4×4 luma, intra_16×16 luma, and the associated chroma are determined independently.

A detail description of the non-RD inter mode cost method is now presented. It should be noted that the various embodiments as described below are only intended to illustrate various illustrative implementations of the present invention and should not be deemed as limiting the present invention.

The non-RD cost for an MB in inter mode is described below. In one embodiment, inputs to this process are the final MVs, the final refIdx, and the associated cost per MB partition from QPME. For example, output of this process is the non-RD cost per MB for the inter modes inter__16×16, inter__16×8, inter__8×16, inter__8×8, and direct__16×16.

In one embodiment, the non-RD cost for inter__16×16, inter__16×8, inter__8×16 or inter__8×8 are calculated as follows. First compute the ME cost per MB/sub_MB partition. For the inter__16×16, inter__16×8, and inter__8×16 inter modes, the respective MB partition costs are combined to obtain the luma portion of inter_MB_cost for each mode. For the inter__8×8 mode, the luma cost is obtained by adding together the costs of the 4 best 8×8 blocks. The best 8×8 block mode is chosen to be the one with the smallest cost between direct__8×8 and the 8×8 inter cost. The 8×8 inter cost is computed by adding a motion cost component subtype_cost to the 8×8 ME cost. Finally, the chroma cost is added to the luma cost to generate the inter_MB_cost for the inter__16×16, inter__16×8, inter__8×16, and inter__8×8 modes.

Let l be the possible inter mode for a MB, specified as follows:

$$l = \begin{cases} 0, & 16 \times 16 \\ 1, & 16 \times 8 \\ 2, & 8 \times 16 \\ 3, & 8 \times 8 \\ 4, & 16 \times 16 \text{ direct} \end{cases} \quad \text{(EQU. 16)}$$

where k be the MB/sub_MB partition index, and cos $t_{l,k}$ be the QPME cost of MB/sub_MB partition (l,k). Let sad_direct__8×8 m be the SAD associated with direct mode prediction of the mth 8×8 luminance block, where 0≤m≤3. Then define $c_{l,k}$ to be the cost of the kth partition of the lth mode as:

$$c_{l,k} = \begin{cases} cost_{l,k}, & l = 0, 1, 2 \\ \min\left(sad\_direct\_8 \times 8_k, cost_{l,k} + \left(int\left(\frac{\lambda_{mf} * REFBITS[subtype[k]]}{2^{16}}\right)\right)\right), & l = 3 \\ cost_{l,k} - int(16 * \lambda_{me} + 0.4999), & l = 4 \end{cases} \quad \text{(EQU. 17)}$$

where $\lambda_{me} = \sqrt{\lambda_{mode}}$ $\lambda_{mf} = \lambda_{me} * 2^{16} + 0.5$ $subtype[k] = \begin{cases} 3, & B\_Bi\_8 \times 8 \\ 2, & B\_L1\_8 \times 8 \\ 1, & B\_L0\_8 \times 8 \\ 0, & P\_L0\_8 \times 8 \text{ or } B\_Direct\_8 \times 8 \end{cases}$ $REFBITS[x] = 2 * int(\log_2(x+1)) + 1, \quad x \geq 0$ $cost_{l,k} = SAD_{l,k} + \lambda_{me} *$
$(MVBITS[DMVx_{l,k}] + MVBITS[DMVy_{l,k}])$ $MVBITS[x] = \begin{cases} 1, & |x| = 0 \\ 2 * int(\log_2(|x|)), & |x| \geq 1 \end{cases}$ where $DMVx_{l,k}$ is the horizontal component of MV difference between a MV and its predictor, and $DMVy_{l,k}$ is the vertical component of MV difference between a MV and its predictor.

The non-RD cost for intra and inter modes may be calculated from luma component only.

Let $Cb_{l,k}(i,j)$ and $Cr_{l,k}(i,j)$ be the (i,j)th pixel of the kth partition of the lth mode partitioning of chroma 8×8 blocks, where 0≤l≤3, and let $Cb'_{l,k}(i,j)$ and $Cr'_{l,k}(i,j)$ be the (i,j)th pixel of the kth partition of the lth mode partitioning of chroma MC predicted 8×8 blocks. Then the inter MB cost of the lth mode is:

$$c_l = \sum_{k=0}^{k<part(l)} \left\{ c_{l,k} + \sum_{i,j} (|Cb_{l,k}(i,j) - Cb'_{l,k}(i,j)| + |Cr_{l,k}(i,j) - Cb'_{l,k}(i,j)|) \right\} \quad \text{(EQU. 18)}$$

where $part(l) = \begin{cases} 1, & l = 0, 4 \\ 2, & l = 1, 2 \\ 4, & l = 3 \end{cases}$ The best inter__16×16 mode and cost for the MB are, respectively:

$$\text{Inter\_mode} = \underset{l}{\arg\min} c_l, \quad \text{(EQU. 19)}$$

and $$\text{Inter\_cos t} = \min c_l. \quad \text{(EQU. 20)}$$

It should be noted that the above arrays of MVBITS[.] and REFBITS[.] can be the true numbers of bins associated with the motion vectors and the reference indices based upon the H.264/AVC specification.

Figure 5:
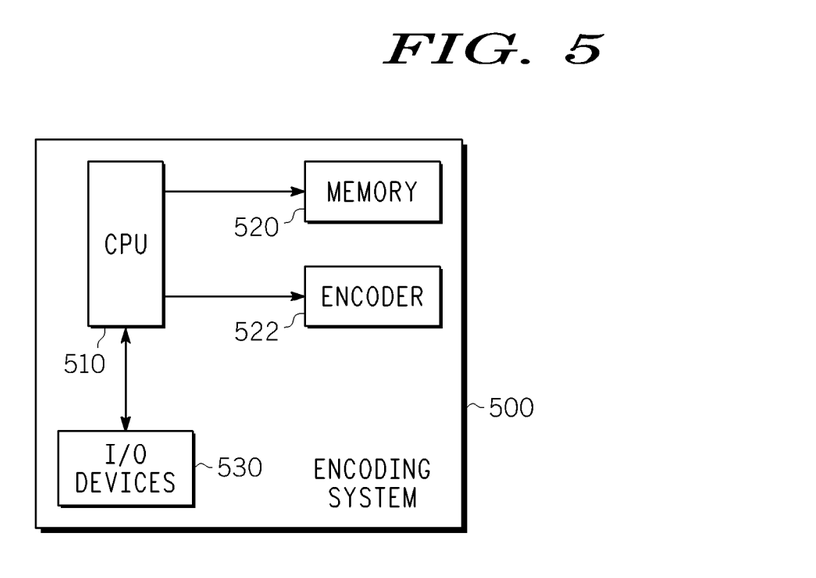
FIG. 5 is a block diagram depicting an exemplary embodiment of a general purpose computer suitable for implementing the processes and methods described herein.

FIG. 5 is a block diagram of the present encoding system being implemented with a general purpose computer. In one embodiment, the encoding system 500 is implemented using a general purpose computer or any other hardware equivalents. More specifically, the encoding system 500 comprises a processor (CPU) 510, a memory 520, e.g., random access memory (RAM) and/or read only memory (ROM), an encoder 522 employing the present method of an external FPME, and various input/output devices 530 (e.g., storage devices, including but not limited to, a tape drive, a floppy drive, a hard disk drive or a compact disk drive, a receiver, a transmitter, a speaker, a display, an output port, a user input device (such as a keyboard, a keypad, a mouse, and the like), or a microphone for capturing speech commands).

It should be understood that the encoder 522 can be implemented as physical devices or subsystems that are coupled to the CPU 510 through a communication channel. Alternatively, the encoder 522 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 520 of the computer. As such, the encoder 522 (including associated data structures and methods employed within the encoder) of the present invention can be stored on a computer readable medium or carrier, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method for selecting a coding mode for a block of a current picture, comprising:
   receiving the block of a current picture;
   subtracting a prediction block from the received block to calculate a prediction residual block;
   performing a forward transform, quantization, dequantization, and inverse transform on the prediction residual block to calculate a reconstructed prediction residual block including:
   performing the forward transform on the prediction residual block to calculate a transformed prediction residual block, and
   performing the quantization on the transformed prediction residual block to calculate a quantized transformed prediction residual block;
   performing a binarization process on the quantized transformed prediction residual block, resulting in a plurality of bins;
   computing a coding bits parameter from the plurality of bins;
   measuring a coding distortion parameter between the prediction residual block and the reconstructed prediction residual block; and
   selecting the coding mode in accordance with a cost function for coding the received block, wherein the cost function comprises the coding distortion parameter and the coding bits parameter.

2. The method of claim 1, wherein the cost function further comprises a control parameter that is a function of a quantization parameter used for the received block.

3. The method of claim 1, wherein said block is a macroblock.

4. The method of claim 1, further comprising:
   comparing said selected coding mode with a skip mode to determine a final coding mode for coding said block.

5. The method of claim 4,
   wherein if a cost of said selected coding mode is lower than a cost of the skip mode, then said selected coding mode is used as said final coding mode for coding said block; or
   wherein if a cost of said selected coding mode is higher than a cost of the skip mode, then said skip mode is used as said final coding mode for coding said block.

6. A method for selecting a coding mode for a block of a current picture, comprising:
   receiving the block of a current picture;
   subtracting a prediction block from the received block to calculate a prediction residual block;
   performing the forward transform, quantization, dequantization, and inverse transform on the prediction residual block to calculate a reconstructed prediction residual block, including:
   performing the forward transform on the prediction residual block to calculate a transformed prediction residual block,
   performing the quantization on the transformed prediction residual block to calculate a quantized transformed prediction residual block, and
   performing the dequantization on the quantized transformed prediction residual block to calculate a dequantized transformed prediction residual block,
   performing a binarization process on the quantized transformed prediction residual block, resulting in a plurality of bins;
   computing a coding bits parameter from the plurality of bins;
   measuring a coding distortion parameter between the transformed prediction residual block and the dequantized transformed prediction residual block; and
   selecting the coding mode in accordance with a cost function for coding the received block, wherein the cost function comprises the coding distortion parameter and the coding bits parameter.

7. The method of claim 6, wherein the cost function further comprises a control parameter that is a function of a quantization parameter used for the received block.

8. The method of claim 6, wherein said block is a macroblock.

9. The method of claim 6, further comprising:
   comparing said selected coding mode with a skip mode to determine a final coding mode for coding said block.

10. The method of claim 9,
    wherein if a cost of said selected coding mode is lower than a cost of the skip mode, then said selected coding mode is used as said final coding mode for coding said block; or
    wherein if a cost of said selected coding mode is higher than a cost of the skip mode, then said skip mode is used as said final coding mode for coding said block.

11. A method for selecting a coding mode for a block of a current picture, comprising:
    receiving the block of a current picture;
    subtracting a prediction block from the received block to calculate a prediction residual block;
    performing a forward transform, quantization, dequantization, and inverse transform on the prediction residual block to calculate a reconstructed prediction residual block, including
    performing the forward transform on the prediction residual block to calculate a transformed prediction residual block, and
    performing the quantization on the transformed prediction residual block to calculate a quantized transformed prediction residual block
    directly estimating a coding bits parameter from the quantized transformed prediction residual block;
    measuring a coding distortion parameter between the prediction residual block and the reconstructed prediction residual block; and
    selecting the coding mode in accordance with a cost function for coding the received block, wherein the cost function comprises the coding distortion parameter and the coding bits parameter.

12. The method of claim 11, wherein the cost function further comprises a control parameter that is a function of a quantization parameter used for the received block.

13. The method of claim 11, wherein said block is a macroblock.

14. The method of claim 11, further comprising:
    comparing said selected coding mode with a skip mode to determine a final coding mode for coding said block.

15. The method of claim 14,
    wherein if a cost of said selected coding mode is lower than a cost of the skip mode, then said selected coding mode is used as said final coding mode for coding said block; or wherein if a cost of said selected coding mode is higher than a cost of the skip mode, then said skip mode is used as said final coding mode for coding said block.

16. A method for selecting a coding mode for a block of a current picture, comprising:

receiving the block of a current picture;

subtracting a prediction block from the received block to calculate a prediction residual block;

performing a forward transform, quantization, dequantization, and inverse transform on the prediction residual block to calculate a reconstructed prediction residual block, including performing a forward transform on the prediction residual block to calculate a transformed prediction residual block, performing quantization on the transformed prediction residual block to calculate a quantized transformed prediction residual block, and performing dequantization on the quantized transformed prediction residual block to calculate a dequantized transformed prediction residual block, directly estimating a coding bits parameter from the quantized transformed prediction residual block;

measuring a coding distortion parameter between the transformed prediction residual block and the dequantized transformed prediction residual block; and selecting the coding mode in accordance with a cost function for coding the received block, wherein the cost function comprises the coding distortion parameter and the coding bits parameter.

17. The method of claim 16, wherein the cost function further comprises a control parameter that is a function of a quantization parameter used for the received block.

18. The method of claim 16, wherein said block is a macroblock.

19. The method of claim 16, further comprising:

comparing said selected coding mode with a skip mode to determine a final coding mode for coding said block.

20. The method of claim 19, wherein if a cost of said selected coding mode is lower than a cost of the skip mode, then said selected coding mode is used as said final coding mode for coding said block; or wherein if a cost of said selected coding mode is higher than a cost of a skip mode, then said skip mode is used as said final coding mode for coding said block.

* * * * *